United States Patent [19]
Guile et al.

[11] 3,873,939
[45] Mar. 25, 1975

[54] AERODYNAMIC WINDOW

[75] Inventors: Roy N. Guile, Wethersfield; C. Edward Kepler, East Hartford, both of Conn.

[73] Assignee: United Aircraft Corporation, East Hartford, Conn.

[22] Filed: Jan. 28, 1974

[21] Appl. No.: 437,121

[52] U.S. Cl. ............. 331/94.5 R, 350/319, 330/4.3
[51] Int. Cl. ............................................ H01s 3/22
[58] Field of Search ................... 350/319; 331/94.5; 330/4.3

[56] References Cited
UNITED STATES PATENTS

| | | | |
|---|---|---|---|
| 3,604,789 | 9/1971 | McLafferty | 350/319 |
| 3,617,928 | 11/1971 | Hausmann | 331/94.5 |
| 3,654,569 | 4/1972 | Hausman | 331/94.5 |

OTHER PUBLICATIONS

Parmentier, "Supersonic flow aerodynamic windows . . . ," AIAA Paper 72-710, June, 1972, 10 pages. Avail. A.U. 257.

*Primary Examiner*—Robert J. Webster
*Attorney, Agent, or Firm*—Jack N. McCarthy

[57] ABSTRACT

A gas laser emits an output laser beam from a low pressure region to a region having a higher pressure. This is done through an opening in the side of a laser device. Under normal circumstances, the provision of such an opening would incur a flow of air from the high pressure side, externally of the laser device, to the low pressure side within the device. To prevent this, an aerodynamic window is placed in a passageway leading from said opening in the laser device through which the laser beam passes. A gas flow is passed across said passageway which will provide a flow which is approximately the flow of a segment of a free-vortex flow field having a pressure differential across the segment which is equal to that between the low and high pressure regions. A multi-element nozzle directs the gas into the passageway and an opening collects the flow onto the other side of said passageway. A curved deflector is provided to start the formation of the segment of the free-vortex flow, if desired.

7 Claims, 7 Drawing Figures

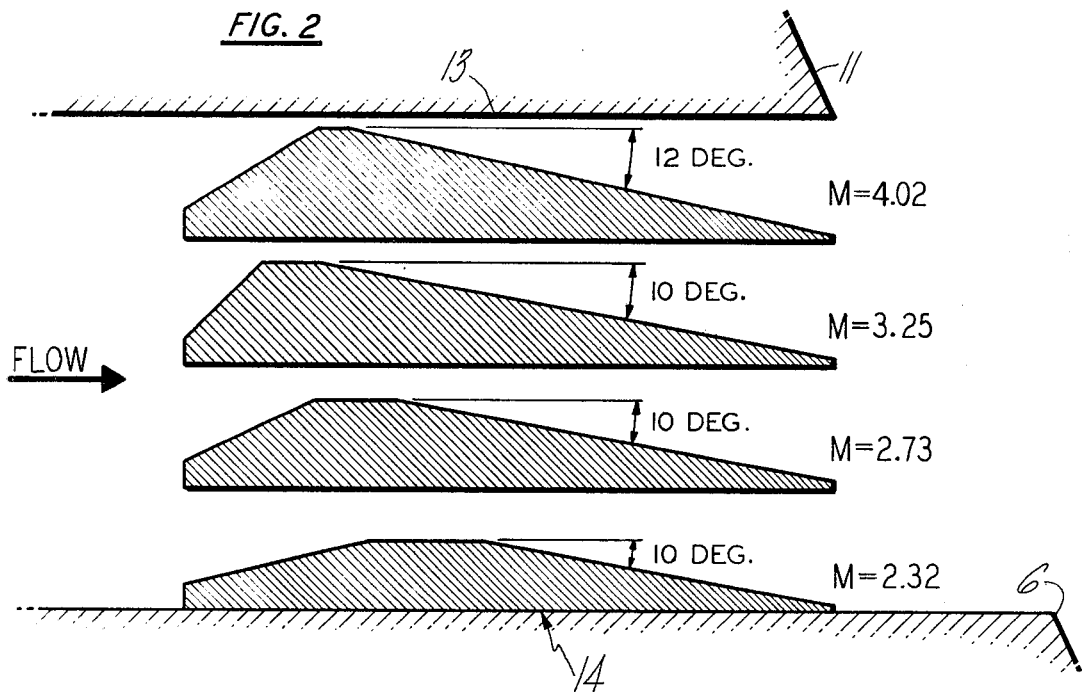
FIG. 2
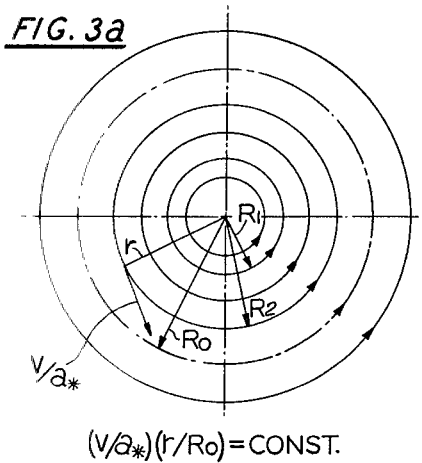
FIG. 3a
$(V/a_*)(r/R_o) = \text{CONST.}$
FIG 3b
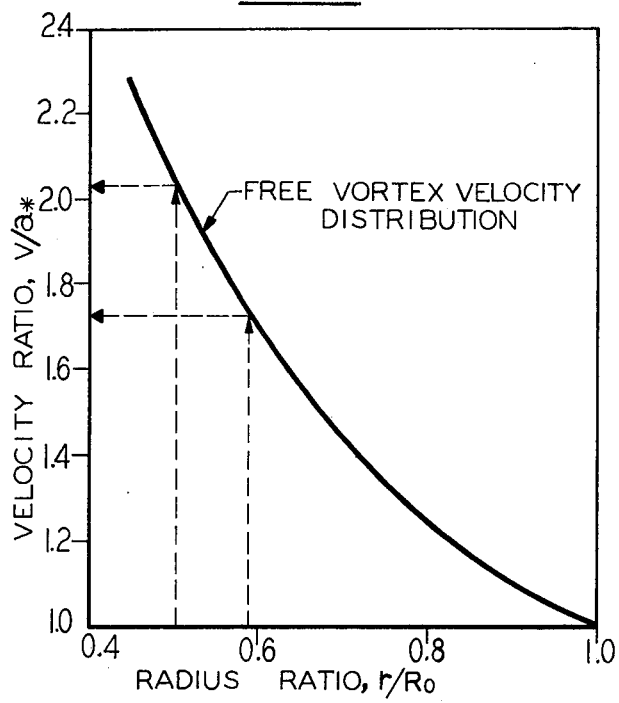
FIG. 3C
FREE VORTEX VELOCITY DISTRIBUTION

AERODYNAMIC WINDOW

BACKGROUND OF THE INVENTION

This invention relates to aerodynamic windows in general and is shown in combination with a gas laser. In lasers of low power, windows with physical walls made of materials which transmit the laser wavelength have been used, but subject window is for use when the laser beam will distort or disintegrate physical window materials. Other aerodynamic windows of this type are set forth below: U.S. Pat. No. 3,604,789, U.S. Pat. No. 3,617,928 and U.S. Pat. No. 3,654,569.

SUMMARY OF THE INVENTION

A primary object of this invention is to provide an aerodynamic window which would permit passage of a laser beam with no physical obstructions yet prevent or minimize flow through said window between two regions of different pressures.

In accordance with the present invention, flow of an aerodynamic window between two regions of different pressure produces a flow field which approximates a segment of a free vortex by the use of a multi-element nozzle array.

An object of this invention is to reduce the gas supply mass flow to be supplied to an aerodynamic window to create the gas jet which is used to isolate the low pressure region from the high pressure region.

It is a further object of this invention to provide an aerodynamic window which will reduce laser beam quality degradation to an acceptable level.

Another object of this invention is to reduce changes in beam direction and jitter, which is fluctuation of beam direction.

BRIEF DESCRIPTION OF THE DRAWINGS

FIG. 2 is an enlarged view of a multi-element nozzle of the aerodynamic window;

FIG. 3a is a diagram showing an end view taken through free-vortex flow field;

FIG. 3b is a diagram of a segment of a free-vortex flow field;

FIG. 3c is a graph showing a representative curve of free-vortex velocity distribution giving the variation of velocity ratio with radius ratio;

DESCRIPTION OF THE PREFERRED EMBODIMENT

Figure 1:
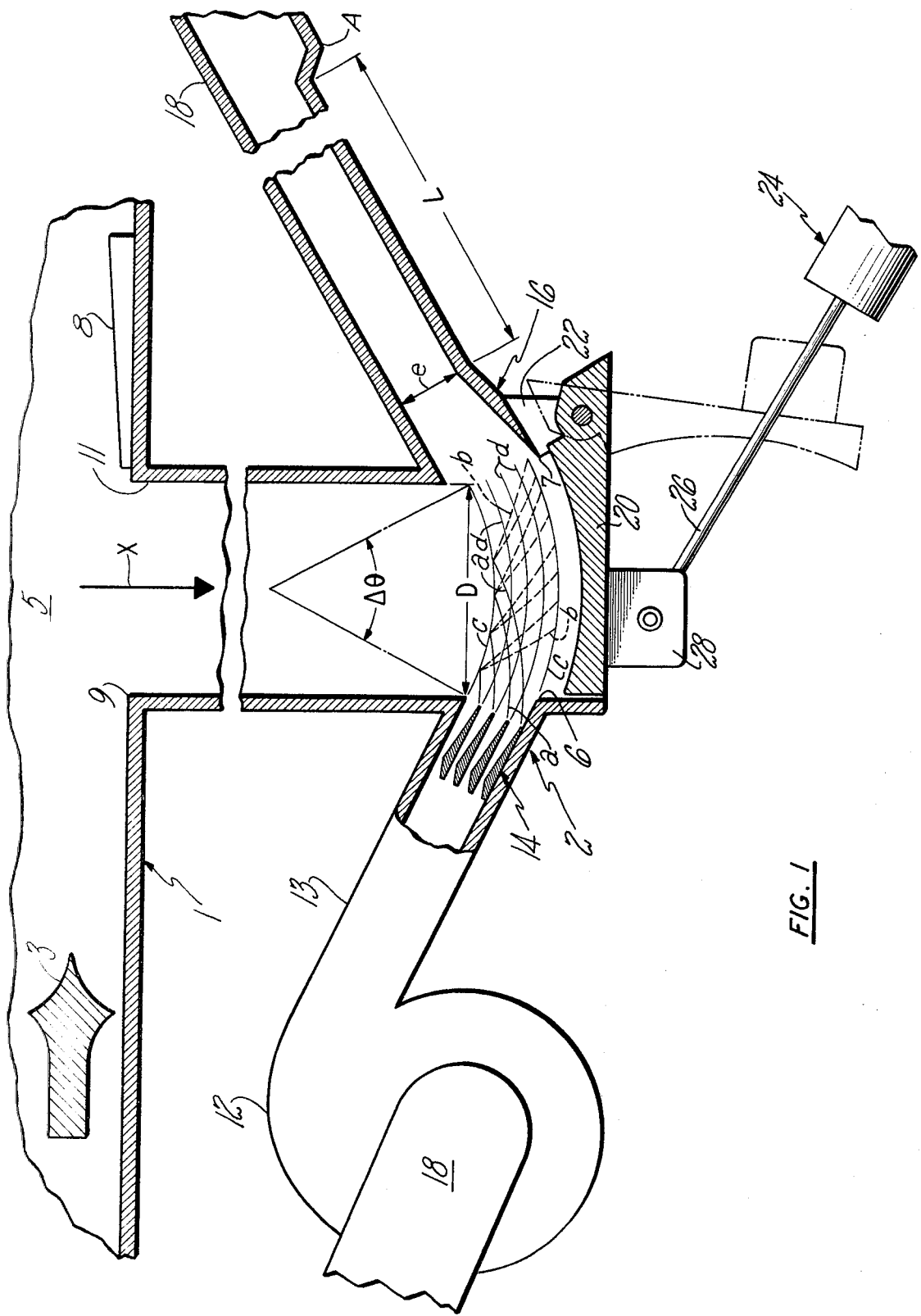
FIG. 1 is a view of the aerodynamic window as shown in relation to a laser device.

A gas dynamic laser 1 comprises a nozzle means 3, a laser cavity 5 and a diffuser section not shown. A similar nozzle means is disclosed in U.S. Pat. No. 3,602,432. More information on a laser construction can be found in the patents referred to above and much other prior art. The laser beam X formed in the cavity 5 is directed through an opening 9 in the side of the laser. A mirror 8 is part of the optical system which directs the beam X through the opening 9. A passageway 11 extends downwardly from and around the opening 9 through which the laser beam X passes from the cavity. A centrifugal aerodynamic window 2 is provided which is fixedly connected to the passageway 11 to form an aerodynamic boundary across said passageway so that the difference in pressure between that in the cavity 5 of the laser 1 and the pressure externally of the laser is prevented from equalizing.

The aerodynamic window 2 includes a conduit 13 connected to an opening 6 placed in the side of the passageway 11 through which a gas under pressure is directed into the passageway. This gas flow is received in an opening 7 on the opposite side of the passageway. A multi-element nozzle array 14 is located in conduit 13 adjacent the opening 6 and directs its flow therethrough into passageway 11 so as to enter opening 7. A pump 12 connected to conduit 13 supplies high pressure air or other gas, to the nozzle array through said conduit 13.

Opening 7 provides an entrance to a diffuser 16 which extends from the opening 7 to the point A. This diffuser 16 serves to increase the static pressure of the flow either to permit the flow to be exhausted to the atmosphere in an open loop system or reducing the requirements of the pump 12 in a closed system such as that shown in FIG. 1. The diffuser 16 empties into a duct 18 which in turn directs the flow back into an inlet opening in the pump 12. This provides a closed loop system which will conserve aerodynamic window gas.

A starting deflector 20 is pivotally mounted on a bracket 22 fixed to the structure of the diffuser. The contour of the deflector 20 would be designed to match the curvature of the intended flow and would serve to guide the flow into the opening 7 of the inlet to the diffuser 16 during starting. This deflector 20 is actuated by a cylinder-piston unit 24 which has one end of an actuating rod 26 pivoted to a bracket 28 on the deflector 20 while the other end of the cylinder 24 is pivotally mounted to other structure fixed relative to the diffuser 16. It can be seen that actuation of the unit 24 will move the deflector 20 between its closed position shown in solid lines and its open position shown in phantom.

Figure 3D:
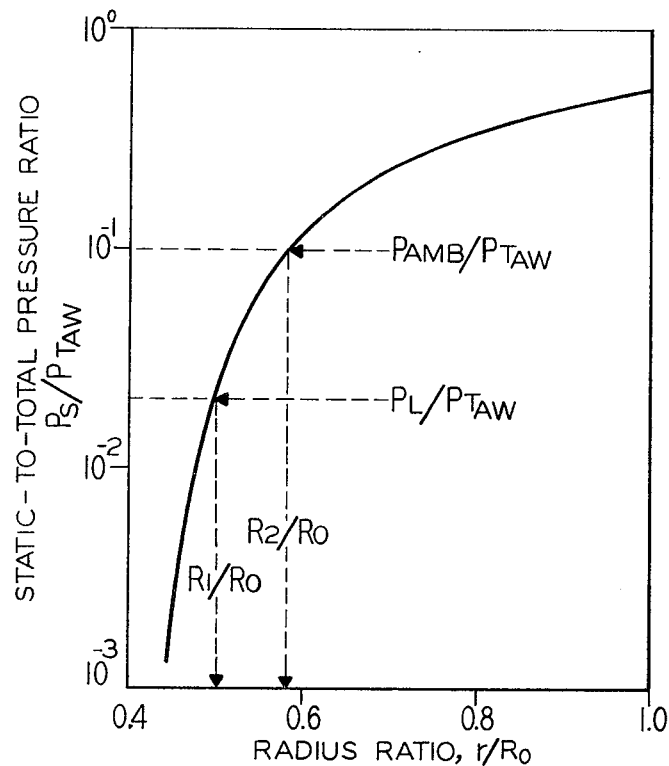
FIG. 3d is a graph showing a representative curve of free-vortex pressure distribution obtained using the velocity distribution of FIG. 3c and the isentropic flow relationships.

The aerodynamic window 2 uses its multi-element nozzle array 14 to produce a flow field across the passageway 11 which will cover the entire opening and which approximates a segment of a free-vortex flow field. The characteristics of a free-vortex flow field can be described with the aid of FIG. 3a. FIG. 3a shows a free-vortex flow field wherein the streamlines are concentric circles and the velocity distribution is such that the product of velocity and radius is a constant. In FIG. 3a the non-dimensional velocity is shown as the ratio of the local velocity to the well-known critical sound speed and the radius $R_0$ is that radius where the value of $v/a_* = 1.0$ so that the free-vortex flow field condition is defined by the requirement that the product of $(v/a_*)$ and $(r/R_0)$ is a constant. The resulting velocity distribution given in FIG. 3c, can be used to determine the ratio of static-to-total pressure throughout the free-vortex flow field (FIG 3d) from the equation $$P_s/P_T = \left[1 - \frac{\gamma-1}{\gamma+1}\left(\frac{V}{a_*}\right)^2\right]^{\frac{\gamma}{\gamma-1}}$$

for compressible isentropic flow ($\gamma$ is the ratio of specific heats).

FIG. 3b illustrates a segment of the free-vortex flow field and is bounded by arcs of radii $R_1$ and $R_2$ and is included within an angular segment $\Delta\theta$, of the 360° flow field of FIG. 3a. This segment of the free-vortex flow field is sized to span the passageway 11 of the aerodynamic window 2 with D equal to the width of the passageway 11, while having a pressure on one side equal to the pressure in the laser cavity and having the pressure on the other side equal to the pressure of the atmosphere.

The conditions defining the free-vortex flow field of which a segment is to be approximated are determined to establish appropriate size. Determination of the free-vortex flow field conditions begins with the selection of the properties of the supply gas. The gas composition, supply total temperature, $T_{T_{AW}}$, and supply total pressure, $P_{T_{AW}}$, are chosen to be compatable with the system for which the window is being constructed. For a laser system the supply gas must be transparent to the laser radiation, e.g., dry air or nitrogen for a gas dynamic laser. The ratios of laser cavity pressure to supply total pressure, $P_L/P_{T_{AW}}$, and ambient pressure to supply total pressure, $P_{INB}/P_{T_{AW}}$, are formed defining the static-to-total pressure ratios at the respective radii $R_1$ and $R_2$ bounding a segment of the free-vortex flow field. These pressure ratios define the values of $R_1/R_0$ and $R_2/R_0$ as indicated in FIG. 3d, and in turn fix the velocity ratios $v/a_*$ at $R_1$ and $R_2$ through the free-vortex flow field conditions of FIGS. 3C.

The value of $R_1$ can be calculated trigonometrically from FIG. 3b in terms of the size, D, of the passageway 11 and the flow turning angle $\Delta\theta$. While the value of $\Delta\theta$ may be chosen arbitrarily, it is desirable to maximize $\Delta\theta$ since the mass flow required by the window varies inversely with the sine of $\Delta\theta/2$. The maximum value of $\Delta\theta$ will be influenced by losses in momentum due to turbulent dissipation of the aerodynamic window flow and must be determined experimentally. Values of $\Delta\theta$ between 60° and 70° have been used successfully. With $v/a_*$ known at $R_1$ and $R_2$, and $R_1$ found trigonometrically, the velocity-radius relationship for a free-vortex flow field (FIG. 3a) are used to find $R_2$.

Figure 3E:
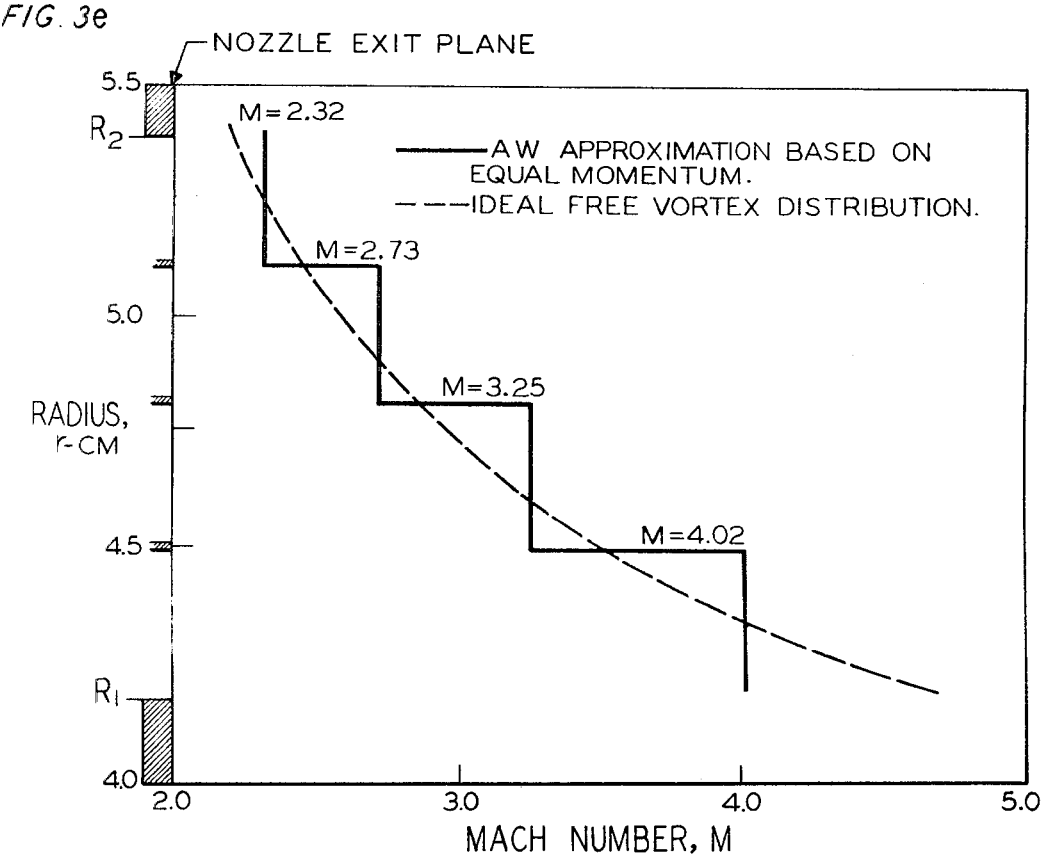
FIG. 3e is a graph showing two representative curves, (a) one being the variation in Mach number with radius for an ideal free-vortex distribution while the other (b) is an approximation to the free-vortex Mach number distribution based on equal momentum.

The Mach number variation (dashed curve of FIG. 3e) between the bounding radii, $R_1$-$R_2$, is found using the equation $$M^2 = \frac{2}{\gamma+1}\left(\frac{v}{a_*}\right)^2\left[1 - \frac{\gamma-1}{\gamma+1}\left(\frac{v}{a_*}\right)^2\right]^{-1}$$

using $v/a_*$ in the free-vortex velocity distribution curve of FIG. 3c. This Mach number variation and the selected supply pressure, $P_{T_{AW}}$, can be used to compute the free-vortex momentum distribution at an ideal nozzle exit plane which would give the flow of a desired segment of a free-vortex flow field to provide the flow for an aerodynamic window.

The aerodynamic window 2 uses an array 14 of supersonic nozzles to approximate the free-vortex momentum distribution across $R_1$-$R_2$. The Mach number of each of the individual nozzle flows, from each of the nozzles of the nozzle array 14, forming portions of the approximate flow of the desired segment of a free-vortex flow field are chosen so that the momentum within the exit plane of each nozzle forming its portion of the approximate flow is made equal to the average momentum for the corresponding portion of the flow of the desired segment of the free-vortex flow field. By employing the multi-element nozzle concept, shock waves and expansion fans exist in the jet flow field which serve to turn the flow across the passageway 11 whereas this turning would be accomplished by Mach waves in the case of the ideal free vortex.

The multi-element nozzle approximation illustrated in FIG. 2 is where a four nozzle element approximation to the ideal free-vortex Mach number distribution was chosen. In this case the nozzle is sized for a 4.25cm passageway 11, the supply total pressure is 10atm and a flow turning angle of 60° is employed. The exit plane of the nozzle array 14 is positioned along an extension of a side of the angle $\Delta\theta$. An aerodynamic window using this distribution was built to seal a cavity at a pressure of 1/30atm from the atmosphere. The Mach numbers shown in FIGS. 2 and 3e were arrived at using the procedure set forth above and the actual conditions set forth above. FIG. 1 shows the supply nozzle array 14 with a representation of the flow-field downstream from the array. The interactions of shock waves a and expansion fans b with the flow boundaries c provide the flow turning as the jet spans the passageway. The nozzle wakes d arise from the presence of the various elements of the array. The diffuser 16 was made having a long intermediate section L which is made approximately ten times the width of the throat e.

While a four-element nozzle array was used, having nozzles of equal area, in the example discussed above, other numbers of elements could be used to approximate the segment of free-vortex flow field using the procedure set forth above. Finally, the choice of a supply pressure other than the 10atm provided by pump 12 would lead to the selection of a different segment of the free-vortex than that used above.

We claim:

1. In combination in a gas laser device, a lasing region of low pressure, an outlet for an output laser beam in said laser device forming an exit to a second region of a different pressure, an outlet passageway connected to said laser device and extending away therefrom around said outlet, means having an array of nozzles for providing an arcuate gas flow across said passageway which is approximately the flow of a segment of a free-vortex flow field having a pressure differential which is equal to that between the lasing region and the second region.

2. A combination as set forth in claim 1 wherein the momentum in the exit plane of each nozzle of said array is smade equal to the average momentum of the corresponding portion of said segment of a free-vortex flow.

3. A combination as set forth in claim 1 wherein said nozzles of said array have their exit planes along a radius which forms one side of the segment of a free-vortex flow field and passes through the center of curvature of the segment of a free-vortex flow field.

4. A combination as set forth in claim 1 wherein an exhaust diffuser is located in said passageway opposite said nozzle array, a deflector means is mounted on said device to direct the flow from said nozzle array into said exhaust diffuser during initiation of gas flow across said passageway.

5. A combination as set forth in claim 4 wherein said deflector means is pivotally mounted and an actuator moves said deflector between a closed position where it directs the flow and an open position where an output laser beam can pass from said outlet passageway.

6. In combination in a system having a first region of low pressure, an openiing in said region forming an exit, an outlet passageway connected to said system and extending away therefrom around said opening, and an aerodynamic window assembly permitting passage therethrough to a second region of higher pressure, said aerodynamic window assembly having an array of nozzles for providing an arcuate gas flow across said passageway which is approximately the flow of a segment of a free-vortex flow field having a pressure differential which is equal to that between the first region and the second region.

7. A combination as set forth in claim 6 wherein the momentum in the exit plane of each nozzle of said array is made equal to the average momentum of the corresponding portion of said segment of a free-vortex flow.

* * * * *